United States Patent [19]
Perldal

[11] 3,871,199
[45] Mar. 18, 1975

[54] BOAT LOCK
[75] Inventor: Karl Lennart Perldal, Torslanda, Sweden
[73] Assignee: AB Volvo Penta, Gothenburg, Sweden
[22] Filed: Feb. 7, 1974
[21] Appl. No.: 440,324

[52] U.S. Cl. .................. 70/252, 70/181, 74/480 B
[51] Int. Cl. ............................................ B60r 25/02
[58] Field of Search ............. 70/181, 240, 241, 242, 70/243, 245, 251, 252, 255, 256, 257, 217; 74/480 B, 501 R, 502

[56] References Cited
UNITED STATES PATENTS

| | | |
|---|---|---|
| 1,394,357 | 10/1921 | Rose ...................................... 70/245 |
| 1,530,801 | 3/1925 | Akin ...................................... 70/245 |
| 1,542,137 | 6/1925 | Hoffmann .............................. 70/245 |
| 2,222,900 | 11/1940 | Fruns ..................................... 292/150 |
| 3,135,130 | 6/1964 | Bentley ............................. 74/480 B |
| 3,184,991 | 5/1965 | Bomberger........................ 74/480 B |
| 3,538,725 | 11/1970 | Guenther et al...................... 70/241 |

Primary Examiner—Peter M. Caun
Attorney, Agent, or Firm—George H. Baldwin; Arthur G. Yeager

[57] ABSTRACT

An anti-theft lock for boats including a key-controlled lock bolt having teeth lockingly engageable with a helical or cogged outer surface of the steering cable. The lock preferably includes a switch for ignition and starting of the boat engine operative by the lock key.

10 Claims, 3 Drawing Figures

3,871,199

BOAT LOCK

The present invention relates to an anti-theft lock for boats having a wheel steering, in which the movement of the steering wheel is transmitted to a rudder by means of a steering cable having a cogged outer surface, said steering cable engaging with a cog wheel which is connected to the steering wheel.

Leisure boats have become increasingly common theft objects these last few years as the number of such boats has increased. A contributing factor to this is that effective theft protection has been lacking in these boats which, for thieves, are sought-after capital goods.

When it comes to automobiles, experience has shown that steering wheel locks constitute effective theft protection. The steering wheel lock normally comprises a locking mechanism having a locking bolt which is arranged at a right angle to the steering column, said locking bolt, in the locking position, engaging in a recess in the steering column. Due to the length and accessible area of the steering column, installation of the steering wheel lock has not entailed any problem. However, wheel steerings for boats often have wheel housings which are cast in one piece and short steering columns, resulting in costly and, for reasons of space, difficult installation of corresponding locks. For these reasons, steering wheel locks for boats have not been installed as extensively as those for automobiles.

The purpose of the present invention is to obtain an inexpensive and easily installed anti-theft lock for boats provided with a steering cable having a cogged outer surface. According to the invention, the lock comprises a housing through which the steering cable moveably extends, a moveable locking bolt which is arranged perpendicular to the steering cable in the housing, the end of said locking bolt which is facing the steering cable being provided with a locking means having teeth which correspond to the opposing cogs on the steering cable and a stopping means which, in the locking position, is arranged to lock the locking bolt with the teeth of the locking means engaging with the cogs on the steering cable.

By means of the invention a steering lock is obtained which can easily be mounted on, for example, the instrument panel without any operation having to be made on the steering wheel arrangement itself, whereby the lock can readily be mounted on existing steering arrangements and be placed in a suitable location on the instrument panel where sufficient space is available. By means of its teeth, the locking means obtains a secure grip on the cogs of the steering cable regardless of the position of the steering wheel and rudder. That is, the cable may be locked, for example, with the rudder hard over.

According to a preferred embodiment of the invention, the anti-theft lock is coordinated with the ignition lock of the boat. In this manner, an extremely compact construction is obtained, through which both the steering and the ignition are locked with one and the same key.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings, in which:

Figure 1:
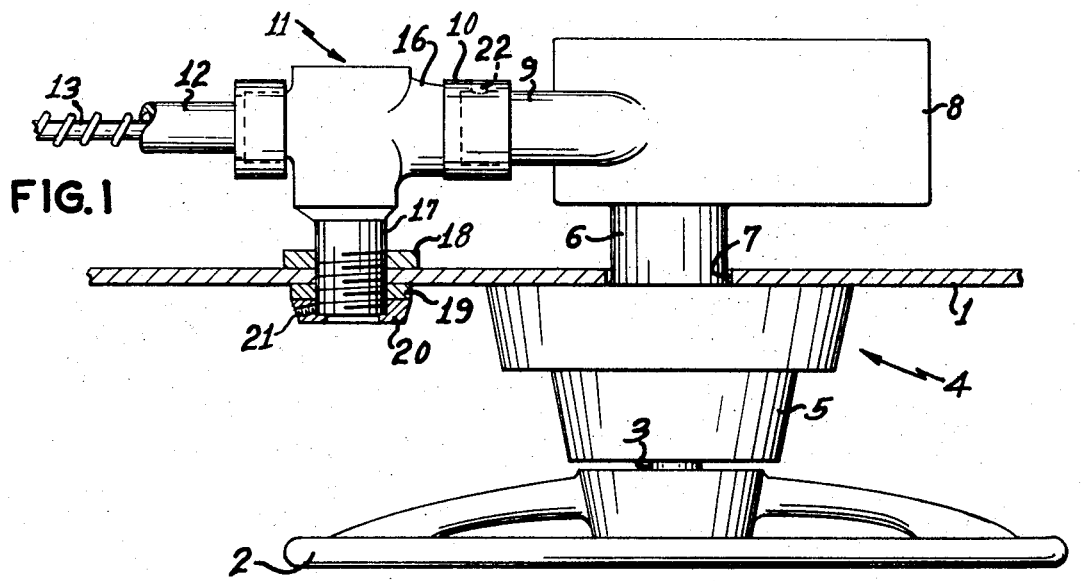
FIG. 1 is a top view of a steering wheel arrangement having an anti-theft lock shown mounted on a fragment of a boat dashboard according to the invention.

Detail 1 in FIG. 1 is a portion of an instrument panel or dashboard of a boat. A steering wheel 2 is attached to a steering column 3 which is turnably mounted in a steering wheel housing which is generally represented by 4, said housing 4 having a housing member 5 which is arranged on the outside of the instrument panel 1, a cylindrical housing member 6 which extends through an opening 7 in the instrument panel 1 and a housing member 8 containing a cogwheel (not shown here) which is attached to the steering column. Housing member 8 has a hollow connecting arm portion 9 to which is threaded into a boss 10 on a locking housing which is generally represented by 11. A casing 12 for a helical steering cable 13 is connected to the housing 11 on the side opposite boss 10, the steering cable 13 being shown in more detail in FIG. 2.

The actual steering assembly is, in itself, of a known kind in which the moveable steering cable 13 in the casing 12 comprises a flexible steel cable including an integral, helically disposed steel wire winding 15, whereby the steering cable 13 is provided with a helical or spirally threaded outer surface. The cog wheel (not shown here) which is turnably mounted in housing member 8 has, on its peripheral surface facing the helical threads of the steering cable 13, corresponding teeth with which the steering cable engages. By means of turning the steering wheel 2 and, therewith, the cog wheel, longitudinal movement of the steering cable 13 in the locking housing 11 and the casing 12 is obtained. This movement is transmitted to the rudder of the boat.

The helical steering cable 13, casing 12, control head 8, steering wheel 2 and mounting members 4 and 5 are a well known arrangement commercially produced by Teleflex Incorporated, Marine Division, North Wales, Pa.

Figure 2:
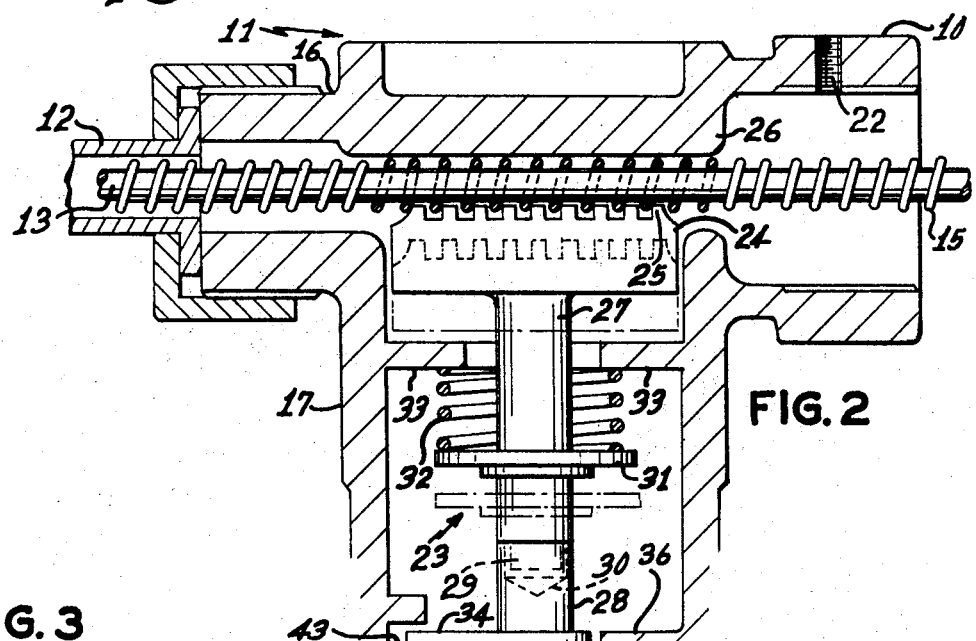
FIG. 2 is a horizontal section on an enlarged scale taken through an embodiment of the anti-theft lock according to the invention.

The locking housing 11, as is especially shown in FIG. 2, comprises a tubular body portion 16, through which the steering cable 13 extends axially and a tubular branch portion 17 directed perpendicular to said body portion 16. Housing portion 17 extends through an opening in the instrument panel 1 (FIG. 1) and is secured by means of a nut 18, a distance ring 19 and a front ring 20 which can be locked to housing member 17 by means of a setscrew 21 provided with a fractural impression, the head of which, after the screw has been tightened, is struck off. In a similar manner, the flange 10 is locked onto connecting branch 9 by means of a setscrew 22 provided with a fractural impression. In this manner, housing 11 is effectively secured to both the instrument panel 1 as well as housing member 8. As shown in the drawings, the screw heads have been struck off.

A locking bolt 23 is moveably positioned inside portion 17 of the housing 11. The end of the locking bolt 23 which is facing the steering cable 13 has a locking means 24 which, on its end which faces the steering cable 13, is formed with teeth 25 which are cooperatively engageable with the steering cable. When the locking bolt 23 is moved in a direction towards the steering cable 13, the teeth 25 engage with the threads and press the steering cable 13 against a backing surface 26 in housing member 16. In this position, the steering cable 13 is locked by bolt 23 and teeth 25 against longitudinal movement in housing 11.

The locking bolt 23 is formed with two sections 27 and 28 which are moveable in relation to each other. For this purpose, the first section 27 has a pintle 29 which projects into a borehole 30 in the second section 28. The first bolt section 27 carries fixedly thereon a stop in the form of a plate 31 for one end of a spiral compression spring 32. The other end of spring 32 lies against a seat portion 33 of housing member 17. In this way, bolt section 27 and, therewith, locking means 24 are spring-loaded in a direction away from the steering cable 13. The second bolt section 28 carries a laterally extending latching arm 34 fixed thereon which, by means of turning bolt section 28 during simultaneous advancement of the same, can be brought into engageable alignment with one or the other of two stops 35 and 36 which are spaced axially in different radial positions in branch portion 17 and which are offset longitudinally of branch portion 17. In the position shown in solid lines in FIG. 2, the latch arm 34 engages stop 35 and, against the biasing force of the spring 32, holds the teeth 25 of the locking means 24 in engagement with the threads of the steering cable. In the position illustrated by broken lines at 34', the arm 34 lies against the second stop 36 and prevents involuntary movement of locking means 24 in a direction towards the steering cable 13. The turning of section 28 and in and out moving of both sections of bolt 23, including locking means 24, is obtained by conventional key lock cylinder (not shown in FIG. 2) which is mounted in housing member 17 and which is operatively connected to bolt section 28.

Figure 3:
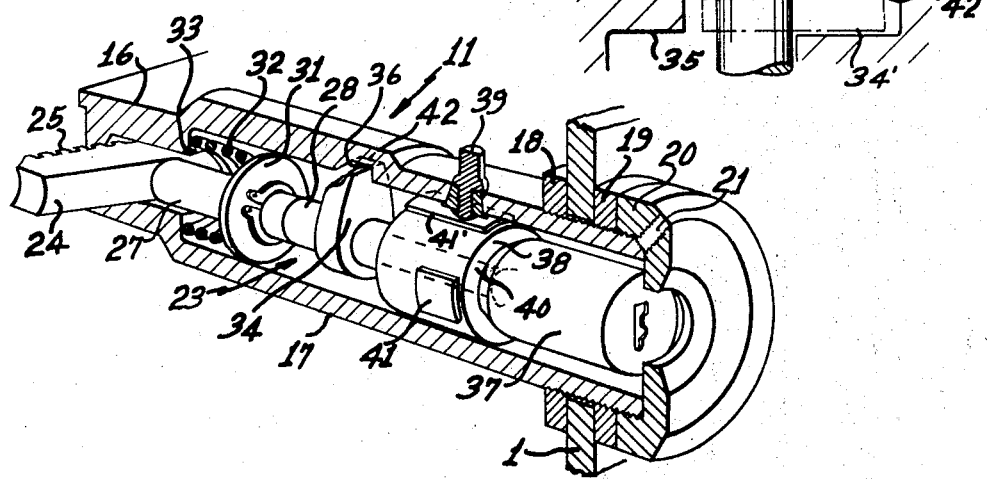
FIG. 3 is a cut-away perspective view of the anti-theft lock in combination with an ignition lock on a smaller scale than FIG. 2.

In FIG. 3, an embodiment of the anti-theft lock according to the invention is shown in combination with an ignition lock, wherein the reference numerals corresponding to the details in FIG. 2 are maintained. A key lock cylinder 37 is mounted in the outer end of branch 17 of housing 11 and is connected to bolt section 28 via a moveable cylindrical member 38 which forms a portion of an electric switch for engine ignition and starting. The switch further comprises fixed electrical contact members, such as member 39, and an insulating drum or sleeve 40 carrying contact plates, such as plates 41 and 41'. In the position shown, the ignition circuit for the engine will be closed, such as through contacts 41' and 39, and arm 34 is disposed in a slot 42, the front surface of which forms the stop 36 which, as described, prevents involuntary locking of the steering cable in response to accidental external contact with the key which might otherwise tend to depress lock cylinder 37, and thus to engage teeth 25 with the cable cog wire 15. It will be understood that the position of arm 34 in FIG. 3 corresponds to the broken line position thereof shown at 34' in FIG. 2. A second slot (not shown) is arranged offset axially toward body portion 16 of housing 11 from slot 42, and radially displaced from slot 42. Such a slot is shown in FIG. 2 at 43. The portion bounding slot 43 lying toward the outer or lock cylinder end of branch 17 constitutes the stop 35 which, when engaged by arm 34, retains the locking means 24 with its teeth 25 in locking engagement with the cable 13.

The switch contacts are so oriented that the starter and ignition circuits are open when the lock cylinder 37 is turned into the position in which arm 34 is nested in slot 43 and engaged against stop 34, with the cable 13 locked by head 24. The lock cylinder is held in the usual manner, such as by a projecting lock bolt, in this position until a key is inserted to retract the lock cylinder bolt, whereupon the key may be used to rotate the lock cylinder. As the arm 34 now rotates away from stop 35, the locking bolt 23 and lock cylinder 37 are forced outwardly by spring 32, releasing head 24 from the cable and aligning arm 34 for further rotation into slot 42 where it is retained by stop 36 to prevent accidental depression of the lock cylinder and locking bolt 23. As the lock cylinder is so rotated, first the ignition contacts of switch 38 are closed, and then the starter contacts. As the engine starts, the lock cylinder is returned to the position in which the starter circuit is broken but the ignition circuit remains closed. Locking is accomplished by further return rotation of the lock cylinder by means of the key until arm 34 clears stop 36, and subsequent depression of lock cylinder 37 and further turning of the cylinder until arm 34 is lodged in slot 43. The key is now withdrawn to lock the cylinder 37 against rotation, leaving head 24 in the cable-locking position.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desire to secure by Letters Patent of the United States is:

1. An anti-theft lock for boats having wheel steering, in which the steering wheel movement is transmitted to a rudder by means of a steering cable formed with a cogged surface driven by a cogwheel which is coupled to the steering wheel, said lock comprising a housing through which the steering cable moveably extends, a locking bolt in said housing which is moveable therein towards and away from said steering cable, said locking bolt including a portion provided with teeth moveable with said locking bolt into and out of meshing engagement with the cogs of said cable, means for moving said locking bolt, and means operative to lock the locking bolt in cable locking position with said teeth engaged with the cogs of the steering cable.

2. The anti-theft lock according to claim 1, wherein said locking bolt moving means is operatively connected with an ignition lock.

3. The anti-theft lock according to claim 2, wherein said ignition lock is arranged as an axial extension of said locking bolt.

4. The anti-theft lock according to claim 2, further comprising a stop arranged to inhibit movement of said locking bolt in a direction towards said steering cable when said ignition lock is in an ignition position.

5. The anti-theft lock according to claim 4, wherein said locking bolt comprises a first section which includes said portion and a second section which is rotatable in relation to said first section about a predetermined axis, said ignition lock comprising a cylinder rotatable about said axis and connected to rotate said second section therewith, and said means operative to lock said locking bolt and said stop comprise fixed stop means in said housing and stop engageable means on said second section rotatable with said second section.

6. The combination according to claim 1 wherein said means for moving said locking bolt comprises a manually moveable lock member for manual operation by means of a key or the like connected to said locking bolt and operative in response to movement of said locker member to move said locking bolt into position to cause such engagement of said portion.

7. An anti-theft lock for boats having wheel steering in which the rudder is operated by a steering cable having a cogged outer surface and driven by a cooperative cogwheel in mesh with the cogs of the cable, the cogwheel being operatively connected to the steering wheel, said lock comprising a fixed hollow housing through which the cable moveably extends, a locking bolt disposed in said housing and moveable therein toward and away from said cable and having an end portion comprising teeth lockably meshable with the cogs of said cable when said bolt is moved toward said cable into a cable locking position and retractable therefrom when said bolt is moved into a release position away from said cable, and means for selectively moving said locking bolt toward and away from said cable and for locking said bolt in its said cable locking position.

8. The combination according to claim 7 wherein said means for selectively moving said locking bolt comprises a key-actuated cylinder lock mechanism.

9. The combination according to claim 8 wherein said means for moving said locking bolt comprises an ignition switch operably connected to said cylinder lock mechanism.

10. The combination according to claim 7 wherein said means for selectively moving said locking bolt comprises means for locking said bolt in its said cable locking position and for locking said bolt in its said release position.

* * * * *